United States Patent
Woo et al.

(10) Patent No.: US 11,316,145 B2
(45) Date of Patent: Apr. 26, 2022

(54) METHOD FOR FORMING LITHIUM METAL AND INORGANIC MATERIAL COMPOSITE THIN FILM AND METHOD FOR PRE-LITHIATION OF NEGATIVE ELECTRODE FOR LITHIUM SECONDARY BATTERY BY USING SAME

(71) Applicant: LG CHEM, LTD., Seoul (KR)

(72) Inventors: Sang Wook Woo, Daejeon (KR); Eun Kyung Kim, Daejeon (KR); Yoon Ah Kang, Seoul (KR); Jun Hyuk Song, Daejeon (KR); Oh Byong Chae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 245 days.

(21) Appl. No.: 16/606,458

(22) PCT Filed: Aug. 3, 2018

(86) PCT No.: PCT/KR2018/008817
§ 371 (c)(1),
(2) Date: Oct. 18, 2019

(87) PCT Pub. No.: WO2019/031766
PCT Pub. Date: Feb. 14, 2019

(65) Prior Publication Data
US 2020/0136128 A1    Apr. 30, 2020

(30) Foreign Application Priority Data

Aug. 10, 2017  (KR) .................. 10-2017-0101380
Jul. 27, 2018  (KR) .................. 10-2018-0087814

(51) Int. Cl.
*H01M 4/04*   (2006.01)
*H01M 4/1391* (2010.01)
(Continued)

(52) U.S. Cl.
CPC ......... *H01M 4/1391* (2013.01); *H01M 4/049* (2013.01); *H01M 4/0433* (2013.01);
(Continued)

(58) Field of Classification Search
CPC ..................................................... H01M 4/049
See application file for complete search history.

(56) References Cited

U.S. PATENT DOCUMENTS 4,324,846 A * 4/1982 Kaun ................... H01M 10/39
429/112
2002/0037457 A1   3/2002 Choi
(Continued)

FOREIGN PATENT DOCUMENTS

CN   104466095 A   3/2015
CN   104577086 A   4/2015
(Continued)

OTHER PUBLICATIONS

Japanese Office Action for corresponding JP Application No. 2019-557572 dated Nov. 16, 2020 with English Translation.
(Continued)

*Primary Examiner* — Austin Murata
(74) *Attorney, Agent, or Firm* — Birch, Stewart, Kolasch & Birch, LLP

(57) ABSTRACT

A method for pre-lithiation of a negative electrode and a negative electrode formed by the method, the method including forming a mixture of inorganic material powder and molten lithium, forming a lithium metal-inorganic material composite ribbon, rolling the ribbon into a film and bonding the lithium metal-inorganic material composite film on a surface of a negative electrode to form a lithium metal-inorganic material composite layer on the surface of the negative electrode. This method reduces the deterioration of lithium during application of a mixture slurry and a
(Continued)

negative electrode for a secondary battery, manufactured by the method for pre-lithiation, has improved initial irreversibility, and a secondary battery manufactured using such a negative electrode has excellent charging and discharging efficiency.

8 Claims, 2 Drawing Sheets

(51) Int. Cl.
    *H01M 4/131*     (2010.01)
    *H01M 4/485*     (2010.01)
    *H01M 10/0525*     (2010.01)
    *H01M 4/02*     (2006.01)

(52) U.S. Cl.
    CPC ....... *H01M 4/0435* (2013.01); *H01M 4/0471* (2013.01); *H01M 4/0483* (2013.01); *H01M 4/131* (2013.01); *H01M 4/485* (2013.01); *H01M 10/0525* (2013.01); *H01M 2004/027* (2013.01)

(56) References Cited

U.S. PATENT DOCUMENTS

| | | | |
|---|---|---|---|
| 2005/0130043 | A1 | 6/2005 | Gao et al. |
| 2009/0280410 | A1 | 11/2009 | Zaguib et al. |
| 2012/0050953 | A1 | 3/2012 | Lee et al. |
| 2014/0079961 | A1 | 3/2014 | Zhong et al. |
| 2014/0295265 | A1 | 10/2014 | You et al. |
| 2015/0357628 | A1* | 12/2015 | Li ................. H01M 4/1395 252/182.1 |
| 2016/0028081 | A1 | 1/2016 | Zhang et al. |
| 2016/0156065 | A1 | 6/2016 | Visco et al. |
| 2016/0160320 | A1* | 6/2016 | Brandt ................. C22C 21/00 164/460 |
| 2017/0338480 | A1 | 11/2017 | Kim et al. |

FOREIGN PATENT DOCUMENTS

| | | | |
|---|---|---|---|
| CN | 105449165 | A | 3/2016 |
| CN | 102916165 | B | 5/2016 |
| JP | 05-251090 | * | 9/1993 |
| JP | 5-251090 | A | 9/1993 |
| JP | 11-86847 | A | 3/1999 |
| JP | 2008-098151 | A | 4/2008 |
| JP | 2010-160983 | A | 7/2010 |
| JP | 2010-160985 | A | 7/2010 |
| JP | 2017-082303 | A | 5/2017 |
| KR | 2001-0111831 | A | 12/2001 |
| KR | 10-2012-0020897 | A | 3/2012 |
| KR | 10-2014-0046496 | A | 4/2014 |
| KR | 10-1454380 | B1 | 10/2014 |
| KR | 10-1527730 | B1 | 6/2015 |
| KR | 10-1538079 | B1 | 7/2015 |
| KR | 10-2016-0094652 | A | 8/2016 |
| KR | 10-2017-0067326 | A | 6/2017 |
| KR | 10-2017-0084007 | A | 7/2017 |
| KR | 10-2018-0001891 | A | 1/2018 |
| WO | WO 2012/061191 | A2 | 5/2012 |
| WO | WO 2013/187176 | A1 | 12/2013 |
| WO | WO 2019/018386 | A1 | 1/2019 |

OTHER PUBLICATIONS

International Search Report (PCT/ISA/210) issued in PCT/KR2018/008817, dated Mar. 6, 2019.
Indian Office Action dated Jun. 18, 2021 for IN Application No. 201917043273.

* cited by examiner

METHOD FOR FORMING LITHIUM METAL AND INORGANIC MATERIAL COMPOSITE THIN FILM AND METHOD FOR PRE-LITHIATION OF NEGATIVE ELECTRODE FOR LITHIUM SECONDARY BATTERY BY USING SAME

TECHNICAL FIELD

This application claims the benefit of priority based on Korean Patent Application No. 10-2017-0101380 filed on Aug. 10, 2017 and Korean Patent Application No. 10-2018-0087814 filed on Jul. 27, 2018, and the content of these Korean Patent Applications are incorporated herein as part of the present specification.

The present invention relates to a method for pre-lithiating a negative electrode for a secondary battery, and more particularly, to a method for manufacturing a lithium metal-inorganic composite thin film using molten lithium metal and powder-type inorganic material particles and then bonding the composite thin film to a negative electrode to thereby perform pre-lithiation.

BACKGROUND ART

As the price of energy sources increases due to depletion of fossil fuels and the interest in environmental pollution increases, the demand for environmentally friendly alternative energy sources becomes an indispensable factor for future life. Especially, as technology development and demand for mobile devices are increasing, demand for secondary batteries as energy sources is rapidly increasing.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having high energy density, discharge voltage, and output stability.

Generally, in order to prepare a secondary battery, first, a positive electrode and a negative electrode are formed by applying an active material to a surface of a current collector, then a separate is interposed therebetween to thereby make an electrode assembly, which is then mounted in a cylindrical or rectangular metal can or inside a pouch-type case of an aluminum laminate sheet, and a liquid electrolyte in injected or impregnated into the electrode assembly or a solid electrolyte to prepare a secondary battery.

As a negative electrode active material of a lithium secondary battery, various types of carbon-based materials including artificial graphite, natural graphite, and hard carbon capable of inserting and desorbing lithium have been applied. Graphite such as artificial graphite or natural graphite in the carbon-based material has a low discharge voltage of 0.1 V compared to lithium, and batteries using graphite as a negative electrode active material exhibits a high discharge voltage of 3.6 V, which is advantageous in terms of energy density of a lithium battery and guarantees the long life of the lithium secondary battery with excellent reversibility, and thus such batteries are most widely used.

However, when an electrode plate is manufactured using graphite as an active material, the density of the electrode plate is lowered, and the capacity may become low in terms of energy density per unit volume of the electrode plate, which is a problem. Further, since side reactions between graphite and the organic electrolyte are likely to occur at a high discharge voltage, there is a risk of ignition or explosion due to malfunction or overcharging of the battery.

In order to solve this problem, a negative electrode active material of an oxide has recently been developed. A metal-based active material such as Si or Sn has been proposed as a material capable of exhibiting a high capacity and capable of replacing lithium metal. Among them, Si has attracted attention due to their low cost and high capacity (4200 mAh/g).

However, when the silicon-based negative electrode active material is used, the initial irreversible capacity becomes large. During charging and discharging of the lithium secondary battery, lithium discharged from the positive electrode is inserted into the negative electrode at the time of charging, and is discharged from the negative electrode at the time of discharging and returns to the positive electrode. In the case of the silicon negative electrode active material, a large amount of lithium inserted into the negative electrode does not return to the positive electrode at the time of initial charging and thus the initial irreversible capacity becomes large. When the initial irreversible capacity increases, there occurs a problem that the battery capacity and the cycle are rapidly reduced.

In order to solve the above problems, a method of pre-lithiating a silicon oxide negative electrode including a silicon-based negative electrode active material is known. As a pre-lithiation method, known methods include a method of producing an electrode by lithiating a negative electrode active material by a physicochemical method and a method of electrochemically pre-lithiating a negative electrode.

Conventional physico-chemical methods involve the risk of fire and explosion due to environmental factors to be carried out at high temperatures. Conventional electrochemical methods cannot control uniform irreversible capacity uniformly and increase production cost.

US Patent Publication No. 2015-0357628 discloses a technology of coating a negative electrode with a lithium-ceramic extruded product in which ceramic particles are mixed with molten lithium to improve electrode efficiency of a negative electrode active material having a high specific capacity, but since all of the above processes must be performed under an inert gas atmosphere due to the high reactivity of the lithium metal, the processes cannot be easily performed, which is a disadvantage.

Therefore, it is necessary to develop a technology for improving the initial irreversibility and improving the safety of the battery by pre-lithiating a negative electrode having a high capacity by using a relatively easy method.

DISCLOSURE

Technical Problem

The present invention has been devised to solve the problems of the prior art described above, and it is an object of the present invention to provide a pre-lithiation method for improving initial irreversibility of a negative electrode having a high capacity, in which lithium metal can be easily handled while simplifying a process.

It is another object of the present invention to provide a pre-lithiation method for improving the safety of a secondary battery.

Technical Solution

The present invention provides a method for pre-lithiating a negative electrode, the method including: a first step of adding an inorganic powder to molten lithium to form a mixture; a second step of extruding the mixture and cooling the mixture to prepare a lithium metal-inorganic composite ribbon having a thickness of 100 to 200 µm; a third step of rolling the lithium metal-inorganic composite ribbon to produce a lithium metal-inorganic composite thin film; and a fourth step of depositing the lithium metal-inorganic composite thin film on a surface of the negative electrode to form a lithium metal-inorganic composite layer.

According to a preferred embodiment of the present invention, the thickness of the lithium metal-inorganic composite thin film is 1 to 50 µm.

According to a preferred embodiment of the present invention, the inorganic powder may be one or more selected from the group consisting of alumina ($Al_2O_3$), titanium dioxide ($TiO_2$), zirconium dioxide ($ZrO_2$), silicon dioxide ($SiO_2$), tin oxide ($SnO_2$), cerium oxide ($CeO_2$), magnesium oxide (MgO) calcium oxide (CaO) and yttria ($Y_2O_3$).

According to a preferred embodiment of the present invention, the mixing ratio of the molten lithium and the inorganic powder is 70 to 85% by volume of lithium and 15 to 30% by volume of the inorganic substance.

According to a preferred embodiment of the present invention, the particle diameter of the inorganic powder is 0.1 to 10 µm.

According to a preferred embodiment of the present invention, in addition to the inorganic powder, a binder may be further added to the molten lithium solution.

According to a preferred embodiment of the present invention, the lithium metal-inorganic composite layer does not remain in the metallic form of lithium after the initial activation charge.

According to a preferred embodiment of the present invention, the negative electrode may include silicon oxide.

The present invention also provides a negative electrode for a secondary battery manufactured by applying the pre-lithiation method, and a secondary battery including the negative electrode.

Advantageous Effects

According to the present invention, since a lithium metal-inorganic composite thin film is bonded to a negative electrode, the time for exposing lithium to the atmosphere is minimized, and thus, in applying the conventional lithium metal-inorganic material mixture, the problem of deterioration of lithium is improved in the process of applying the mixture slurry due to the high reactivity of lithium metal.

The negative electrode prepared by the pre-lithiation method of the present invention has improved initial irreversibility, and the secondary battery manufactured using such a negative electrode for the secondary battery has excellent charge/discharge efficiency.

In the negative electrode having the lithium metal-inorganic composite layer of the present invention, lithium is inserted into the negative electrode active material layer by pre-lithiation, so that the inorganic material remains in the composite layer, thereby protecting the surface of the negative electrode and improving the safety of the battery.

DETAILED DESCRIPTION OF THE PREFERRED EMBODIMENTS

Hereinafter, the present invention will be described in detail. The present invention is not limited by the following examples and experimental examples. The embodiments according to the present invention may be modified into various other forms, and the scope of the present invention should not be construed as being limited to the embodiments described below. The embodiments of the present invention are provided to more fully describe the present invention to those skilled in the art.

The pre-lithiation of a negative electrode for a secondary battery according to the present invention includes: a first step of adding an inorganic powder to molten lithium to form a mixture; a second step of extruding the mixture and cooling the mixture to prepare a lithium metal-inorganic composite ribbon having a thickness of 100 to 200 µm; a third step of rolling the lithium metal-inorganic composite ribbon to produce a lithium metal-inorganic composite thin film; and a fourth step of depositing the lithium metal-inorganic composite thin film on a surface of the negative electrode to form a lithium metal-inorganic composite layer.

The negative electrode material of the lithium ion battery has a disadvantage that the initial irreversibility is large. In particular, the negative electrode of the Si-based material has a large volume change and surface side reaction, so that a large amount of lithium used during charging cannot be re-discharged at the time of discharging. In order to improve this initial irreversibility, if pre-lithiation is performed before the fabrication of the battery assembly, the side reaction occurs during the first charging in advance. Therefore, when the battery assembly is actually formed and charged/discharged, the first cycle is performed with the reduced irreversibility, thereby reducing the initial irreversibility.

Figure 1:
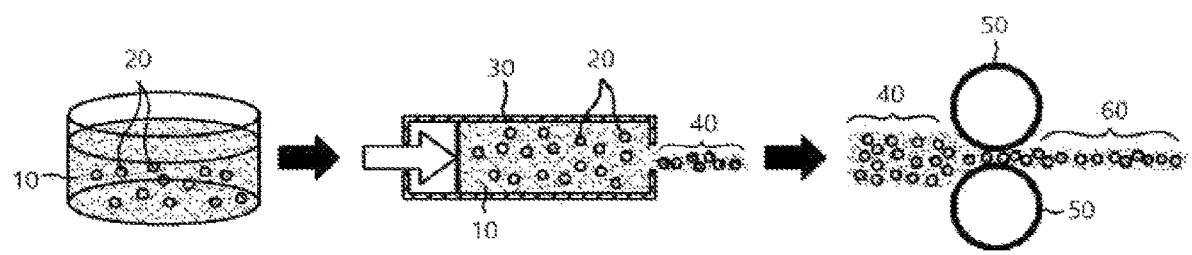
FIG. 1 is a schematic diagram of a manufacturing process schematically showing first to third steps of the present invention.
Figure 2:
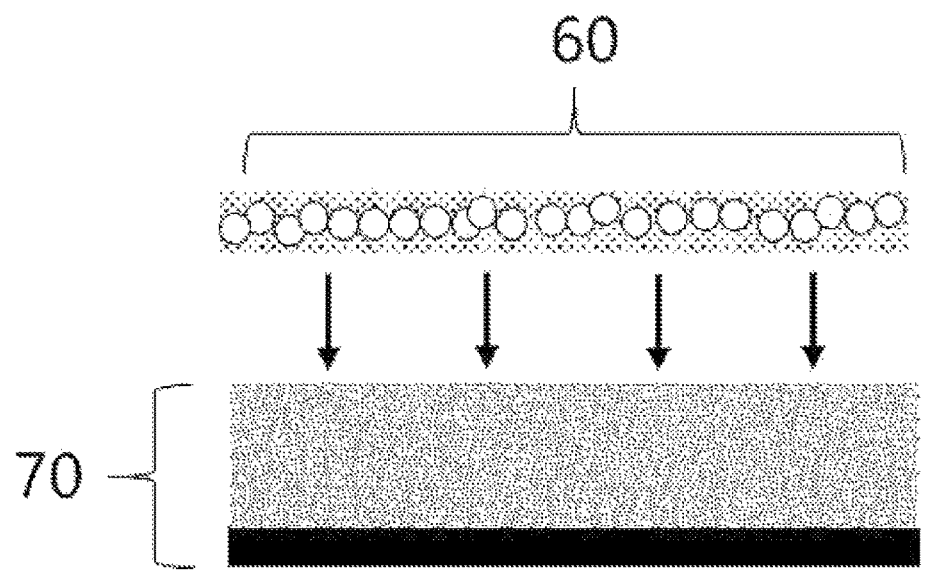
FIG. 2 is a schematic diagram of a manufacturing process showing a fourth step of the present invention.
Figure 3:
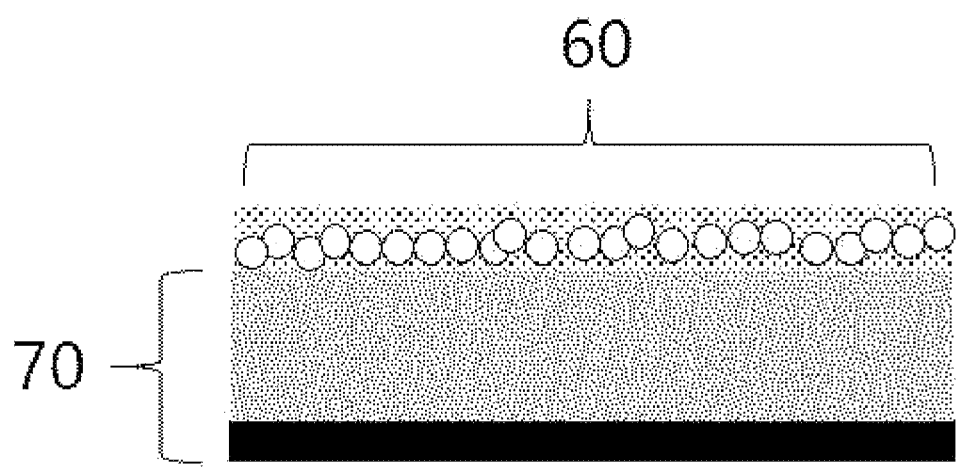
FIG. 3 is a diagram showing a lithium metal-inorganic composite layer formed on an electrode by the fourth step of the present invention and pre-lithiation.
Figure 4:
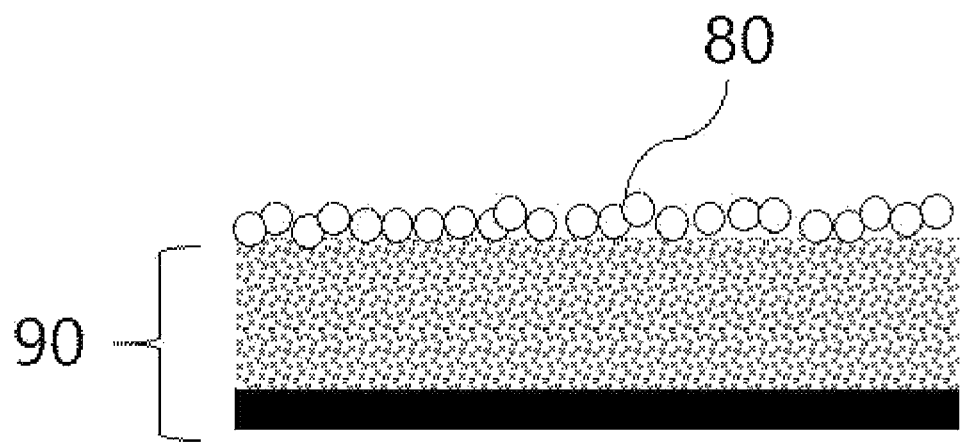
FIG. 4 is a diagram showing an inorganic layer remaining after lithium is absorbed into an electrode from the lithium metal-inorganic composite layer by pre-lithiation of the present invention.

In the present invention, as shown in FIG. 1, the lithium metal-inorganic composite layer is formed on the surface of SiO or a graphite electrode containing SiO having a large initial irreversibility, and the lithium metal part in the lithium metal-inorganic composite layer is used for pre-lithiation to reduce the initial irreversibility, and the inorganic material remaining after the pre-lithiation helps improve the safety of the negative electrode.

In particular, the manufacturing process of a conventional technology of coating a slurry generated by mixing molten lithium with an inorganic material with a negative electrode is difficult due to the high reactivity of lithium metal and there is a possibility that the lithium metal may be deteriorated during the application. However, according to the present invention, since a lithium metal-inorganic composite ribbon is made, the ribbon is rolled to form a thin film, and the thin film is bonded with the negative electrode, there is an advantage that time for lithium to be exposed to the air can be minimized.

The first step of the present invention is to add an inorganic powder to molten lithium to form a mixture. At this time, the melting temperature of lithium is 180° C. to 400° C., and more preferably 190° C. to 250° C. If the melting temperature of lithium exceeds the upper limit value, lithium becomes too highly reactive, and if the melting temperature of lithium is lower than the lower limit value, lithium is not liquidized.

According to a preferred embodiment of the present invention, the inorganic powder may be one or more selected from the group consisting of alumina ($Al_2O_3$), titanium dioxide ($TiO_2$), zirconium dioxide ($ZrO_2$), silicon dioxide ($SiO_2$), tin oxide ($SnO_2$), cerium oxide ($CeO_2$), magnesium oxide (MgO) calcium oxide (CaO) and yttria ($Y_2O_3$). Among them, alumina is most preferable. According to a preferred embodiment of the present invention, the particle diameter of the inorganic powder is 0.1 to 10 μm, more preferably 0.3 to 5 μm, and most preferably 0.5 to 1 μm. If the particle size of the inorganic powder exceeds 10 μm, it may not be dispersed well in the molten lithium, which is not preferable.

According to a preferred embodiment of the present invention, the proportion of the inorganic powder injected into the molten lithium is 70 to 85% by volume of lithium and 15 to 30% by volume of the inorganic substance. When the mixing ratio is satisfied, an effect of improving the safety of the pre-lithiation and the negative electrode is exhibited.

According to a preferred embodiment of the present invention, by further adding a binder to the molten lithium solution in addition to the inorganic powder, it is possible to prevent the lithium metal-inorganic composite layer from being separated from the negative electrode. As the binder, commonly used binders such as PVDF and SBR based binders may be used. Also, polyacrylic acid (PAA), carboxymethyl cellulose (CMC), and polyimide binders may be used.

The preferable content of the binder to be charged into the molten lithium is 1 to 10 parts by weight relative to 100 parts by weight of the inorganic powder to be added together. If it is less than 1 part by weight, the lithium metal-inorganic composite layer may be separated from the negative electrode, and if it exceeds 10 parts by weight, it is not preferable from the viewpoint of pre-lithiation.

In the second step of the present invention, the mixture is extruded and then cooled to produce a lithium metal-inorganic composite ribbon. The mixture can be extruded by a known method. After extrusion, the mixture is cooled to room temperature to form a lithium metal-inorganic composite ribbon having a thickness of 100 to 200 μm. The thickness of the lithium metal-inorganic composite ribbon can be adjusted according to the purpose. If the thickness of the lithium metal-inorganic composite ribbon is less than 100 μm, it is difficult to produce a lithium metal-inorganic composite ribbon by an extrusion method. When the thickness is more than 200 μm, there is a disadvantage in that the energy and manufacturing time are increased during the rolling process for thinning the lithium metal-inorganic composite ribbon made by extrusion.

The third step of the present invention is to make the lithium metal-inorganic composite thin film by rolling the lithium metal-inorganic composite ribbon. The method of rolling the lithium metal-inorganic composite ribbon is generally a method of rolling a metal in the form of a thin film.

According to a preferred embodiment of the present invention, the thickness of the lithium metal-inorganic composite thin film after the rolling is 1 to 50 μm. The thickness is more preferably 1 to 30 μm, and most preferably 5 to 10 μm. When the thickness of the lithium metal-inorganic composite thin film is in the range of 1 to 50 μm, the lithium metal-inorganic composite layer exhibits the effect of improving the safety of the pre-lithiation and the battery.

Conventionally, it has been difficult to apply a slurry of a lithium metal-inorganic compound to a negative electrode. However, the present invention is featured in forming a lithium metal-inorganic composite thin film by the second and third steps and bonding the film to the negative electrode to thereby form a lithium metal-inorganic composite layer on the negative electrode in a relatively easy manner.

In the fourth step of the present invention, the lithium metal-inorganic composite thin film is deposited on the surface of a negative electrode to form a lithium metal-inorganic composite layer. The lithium metal-inorganic composite thin film is placed on a negative electrode, and then laminated by applying heat and pressure.

According to a preferred embodiment of the present invention, the lithium metal-inorganic composite layer does not remain in the metallic form of lithium after the initial activation charge.

The present invention also provides a secondary battery including a negative electrode manufactured by the above-described method.

The secondary battery according to the present invention includes an electrode assembly in which two electrodes of different polarities are stacked in a state separated from each other by a separator. The electrode assembly includes a positive electrode including a positive electrode active material, a negative electrode including a negative electrode active material, and a separator.

Specifically, the positive electrode, for example, may be prepared by applying a mixture of a positive electrode active material, a conductive material and a binder on a positive electrode current collector, followed by drying. If necessary, a filler may be further added to the mixture.

The positive electrode active material according to the present invention may be mixed with a compound, which uses a lithium intercalation material as its main component, such as a layered compound such as lithium cobalt oxide ($LiCoO_2$), lithium nickel oxide ($LiNiO_2$), or a compound substituted with one or more transition metals; lithium manganese oxides such as $Li_{1+x}Mn_{2-x}O_4$ (herein, x is between 0 and 33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; lithium nickel oxide expressed by $LiNi_{1-x}M_xO_2$ (herein. M=Co, Mn, Al, Cu, Fe, Mg, B or Ga, and x=0.01 to 0.3); lithium manganese composite oxide expressed by $LiMn_{2-x}M_xO_2$ (herein, M=Co, Ni, Fe, Cr, Zn or Ta 이고, x=0.01 to 0.1) or $Li_2Mn_3MO_8$ (herein, M=Fe, Co, Ni, Cu or Zn); $LiMn_2O_4$ in which a part of Li in the formula is substituted with an alkaline earth metal ion; disulfide compound; and $Fe_2(MoO_4)_3$ or a compound oxide formed by combination thereof.

The positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The conductive material is usually added in an amount of 1 to 50% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive oxides such as titanium oxide; and conductive materials such as polyphenylene derivatives and the like.

The binder is added in an amount of 1 to 50% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of a positive electrode, and is not particularly limited as long as it is a fibrous material without causing a chemical change in the battery. Examples of the filler include olefin polymers such as polyethylene and polypropylene; fibrous materials such as glass fibers and carbon fibers.

Further, the negative electrode may be formed by coating a negative electrode material on a negative electrode collector and drying the negative electrode active material. The negative electrode may further include the above-described components.

The negative electrode current collector is generally made to a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net a porous body, a foam, and a nonwoven fabric.

As the negative electrode active material of the present invention, a material capable of reversibly adsorbing/discharging lithium ions such as silicon (Si) and tin may be used. As long as such a material is used, it is possible to exhibit the effects of the present invention in any of composite, alloy, compound, solid solution and composite negative electrode active material including silicon-containing material and tin-containing material. As the silicon-containing material, Si, $SiO_x$ ($0.5<x<2.0$) or an alloy, a compound or a solid solution which is generated by substituting part of Si or Si contained in $SiO_x$ with at least one element selected from the group consisting of B, Mg, Ni, Ti, Mo, Co, Ca, Cr, Cu, Fe, Mn, Nb, Ta, V, W, Zn, C, N, and Sn may be used.

These materials may constitute a negative electrode active material alone or may constitute a negative electrode active material by a plurality of kinds of materials. Examples of constituting the negative electrode active material by the plural kinds of materials include a compound containing Si, oxygen and nitrogen, a composite of a plurality of compounds containing Si and oxygen and having different composition ratios of Si and oxygen, and the like. Among these, $SiO_x$ ($0.5<x<2.0$) is preferable because the discharge capacity density is large and the expansion ratio at the time of filling is smaller than that of Si.

The silicon oxide negative electrode is a negative electrode which uses silicon and oxides thereof as main materials in order to increase the capacity density of the negative electrode which uses the existing carbon material such as graphite. It has a theoretical capacity density of 4200 mAh/g, which is much higher than the theoretical capacity density of carbon material of 372 mAh/g, which can be suitably used as a negative electrode for a secondary battery. However, since the silicon oxide negative electrode is inferior in the stability of the form, the initial irreversible capacity is large, and there is a risk that the electrode capacity is reduced or the cell balance is collapsed, and thus a pre-lithiation process as in the present invention is required.

It is possible to use a commonly known polyolefin separator or a composite separator in which an organic and inorganic composite layer is formed on the olefin based material, as a separator for insulating the electrodes between the positive electrode and the negative electrode, and the present invention is not limited to these examples.

The electrolyte injected into the secondary battery is a lithium salt-containing non-aqueous electrolyte, which is composed of a nonaqueous electrolyte and lithium. As the non-aqueous electrolyte, a non-aqueous electrolyte, a solid electrolyte, an inorganic solid electrolyte and the like are used.

Examples of the non-aqueous electrolyte include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymer including an ionic dissociation group, and the like.

Examples of the inorganic solid electrolyte include nitrides, halides, and sulfates of Li such as $Li_3N$, $LiI$, $LiSNI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a substance that is soluble in the non-aqueous electrolyte. The examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium 4-phenylborate, imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N-substituted imidazolidine, ethylene glycol dialkyl ether, ammonium salt, pyrrole, 2-methoxyethanol, aluminum trichloride, etc. may be added to the non-aqueous electrolyte. In some cases, a halogen-containing solvent such as carbon tetrachloride or ethylene trifluoride may be further added to impart nonflammability, or a carbon dioxide gas may be further added to improve high temperature storage characteristics.

Hereinafter, the present invention will be described in more detail through examples below. However, the following Examples and Experimental Examples are provided for illustrating the present invention, and the scope of the present invention is not limited by these Examples and Experimental Examples.

Example 1

<Preparation Method of Lithium Metal-$Al_2O_3$ Composite Thin Film>

Lithium ingots were sufficiently melted at a temperature of 180 degrees Celsius or more to prepare molten lithium, and then $Al_2O_3$ powder having a particle size of 0.5 to 1.0 μm was added and stirred to prepare a mixture. At this time, the ratio of the molten lithium and μm was adjusted to 75 volume % of lithium and 25 volume % of $Al_2O_3$ in a volume ratio. The prepared molten lithium-$Al_2O_3$ mixture was extruded from a frame having a gap of 100 μm and cooled to room temperature to prepare a lithium metal-$Al_2O_3$ ribbon having a thickness of 100 μm. The lithium metal-$Al_2O_3$ ribbon was rolled to a thickness of 5 μm to prepare a lithium metal-$Al_2O_3$ thin film.

<Preparation of Negative Electrode>

As a negative electrode active material, 92 wt % of SiO, 3 wt % of Denka Black (conductive material), 3.5 wt % of SBR (binder) and 1.5 wt % of CMC (thickener) were added to water, to thereby prepare a negative electrode mixture slurry.

The negative electrode mixture slurry was coated on one side of the copper collector, dried and rolled, and then punched to a predetermined size to produce a negative electrode.

<Formation of Lithium Metal-$Al_2O_3$Composite Film on the Surface of Negative Electrode>

A lithium metal-$Al_2O_3$ composite thin film having a thickness of 5 μm prepared above was formed on the surface of the SiO negative electrode by a lamination method to prepare an electrode.

<Preparation of Lithium Secondary Battery>

A lithium metal foil (150 μm) was used as a counter electrode, and a polyolefin separator was interposed between the negative electrode and the counter electrode. Then an electrolytic solution in which 1 M lithium hexafluorophosphate (LiPF 6) was dissolved was injected into a solvent in which ethylene carbonate (EC) and ethyl methyl carbonate (DEC) were mixed at a volume ratio of 50:50, to prepare a coin type half-cell.

Example 2

A battery was prepared in the same manner as in Example 1, except that the thickness of the lithium metal-$Al_2O_3$ ribbon was changed to 150 μm and the thickness of the lithium metal-$Al_2O_3$ thin film was changed to 5 μm.

Example 3

A battery was prepared in the same manner as in Example 1, except that the thickness of the lithium metal-$Al_2O_3$ ribbon was changed to 200 μm and the thickness of the lithium metal-$Al_2O_3$ thin film was changed to 10 μm.

Example 4

A battery was prepared in the same manner as in Example 1, except that the SBR-based binder (6 parts by weight based on 100 parts by weight of $Al_2O_3$) was added to the molten lithium together with the $Al_2O_3$ powder.

Example 5

A battery was prepared in the same manner as in Example 1, except that the polyacrylic acid (PAA)-based binder (8 parts by weight based on 100 parts by weight of $Al_2O_3$) was added to the molten lithium together with the $Al_2O_3$ powder.

Example 6

A battery was prepared in the same manner as in Example 1, except that the ratio of lithium to $Al_2O_3$ was adjusted to 78% by volume of lithium and 22% by volume of $Al_2O_3$.

Comparative Example 1

The battery was prepared in the same manner as in Example 1, except that an untreated SiO electrode was used in place of the SiO electrode on which the lithium metal-$Al_2O_3$ composite layer having an average thickness of 5 μm in the above example is formed as the negative electrode.

Comparative Example 2

Powdered MgO was added to the molten lithium and they were mixed (weight ratio of lithium and MgO particles was 8:2). In the argon protective gas environment, the molten lithium mixed with the MgO was transferred to an extrusion coater so that the mixed molten lithium was coated on the surface of the SiO negative electrode of Example 1 to a thickness of 5 μm, and then cooled at room temperature. Thereafter, a battery was prepared in the same manner as in Example 1.

Comparative Example 3

A battery was prepared in the same manner as in Comparative Example 2, except that $Al_2O_3$ particles were mixed with molten lithium instead of MgO in Comparative Example 2.

Comparative Example 4

A battery was prepared in the same manner as in Comparative Example 2, except that the coating thickness was adjusted to 10 μm in Comparative Example 2.

Comparative Example 5

A battery was prepared in the same manner as in Comparative Example 3, except that the coating thickness was adjusted to 10 μm in Comparative Example 3.

Comparative Example 6

A battery was prepared in the same manner as in Comparative Example 2, except that an argon protective gas atmosphere was not formed at the coating in Comparative Example 2.

Comparative Example 7

A battery was prepared in the same manner as in Comparative Example 3, except that an argon protective gas atmosphere was not formed at the coating in Comparative Example 3.

Experimental Example 1 First Cycle Charge/Discharge Reversibility Test

The coin-type half-cell produced in the above Examples and Comparative Examples was subjected to the charge-discharge reversibility test using an electrochemical charging/discharging device. During the first cycle charge, the current was applied at a current density of 0.1 C-rate up to a voltage of 0.005V (vs. Li/Li+) and discharged at the same current density up to a voltage of 1.5V (vs. Li/Li+). At this time, the charging capacity and the discharging capacity were measured, and the ratio (discharging capacity/charging capacity*100) was calculated and shown in Table 1.

Experimental Example 2 Calorimetric Test

In order to perform the differential scanning calorimetry, the coin-type half-cells of Examples and Comparative Examples were charged and discharged for 1 cycle as described above, and charged to 0.005 V in the second cycle to activate the negative electrode, 0.1 ml of electrolyte was added to 13 mg of the thus-obtained charged negative electrode powder, and was then loaded to a DSC equipment (mettle Toledo). The thus-loaded sample was heated at a heating rate of 10° C./min. and the calorie was measured. The results are shown in Table 1.

TABLE 1

| | First charge/discharge efficiency (%) | Onset(° C.) | Main peak(° C.) | Calorific value (J/g) |
|---|---|---|---|---|
| Example 1 | 95 | 120 | 296 | 2023 |
| Example 2 | 93 | 120 | 297 | 2027 |
| Example 3 | 92 | 120 | 296 | 2022 |
| Example 4 | 91 | 121 | 298 | 2033 |
| Example 5 | 90 | 122 | 298 | 2030 |
| Example 6 | 94 | 120 | 296 | 2019 |
| Comparative Example 1 | 73 | 97 | 261 | 4150 |
| Comparative Example 2 | 85 | 115 | 271 | 2950 |
| Comparative Example 3 | 87 | 120 | 280 | 2680 |
| Comparative Example 4 | 87 | 116 | 270 | 2900 |
| Comparative Example 5 | 88 | 120 | 280 | 2580 |
| Comparative Example 6 | 78 | 115 | 270 | 3380 |
| Comparative Example 7 | 79 | 120 | 280 | 3155 |

The first cycle charge/discharge reversibility of Example 1 was improved by 22% compared to Comparative Example 1. The reason why the reversibility of Example 1 was improved would be because the lithium metal of the lithium metal-inorganic composite layer formed on the surface of the SiO electrode reacted with SiO to cause a surface side reaction in advance and experienced volume change caused by charging, thereby making dead-lithium by volume expansion in advance. It is understood that the lithium metal consumed in the side reaction at the time of the first charge could be reduced by experiencing the side reaction in advance, and thus most of the lithium metal, which was inputted at the time of charging, was reversibly outputted.

In addition, the onset temperature and the main peak temperature of Examples 1 to 6 were higher than those of Comparative Example 1, which means that the cell is maintained safely to a higher temperature. Further, the fact that Examples 1 to 6 are smaller in calorific values than Comparative Example 1 is interpreted to mean that it is safer at high temperature exposure. The reason why the SiO electrode in which the lithium metal-inorganic composite layer of this embodiment is introduced has a safer result is because the lithium metal in the lithium metal-inorganic composite layer disappeared after the pre-lithiation, and the remaining inorganic layer played a role as a protective layer for protecting the surface of SiO electrode.

In the batteries of Comparative Examples 2 to 7, the lithium metal-inorganic composite layer was introduced into the negative electrode, but it was observed that the charge-discharge efficiency was poor as compared with the batteries of Examples 1 to 6. This is presumably because the lithium metal was exposed to the atmosphere during the application of the molten lithium-inorganic mixed solution to the SiO negative electrode, resulting in the degeneration of the lithium and the lack of pre-lithiation of the negative electrode.

DESCRIPTION OF SYMBOLS

10: molten lithium
20: inorganic powder
30: extruder
40: lithium metal-inorganic composite ribbon
50: roller
60: lithium metal-composite thin film
70: negative electrode
80: inorganic layer
90: pre-lithiated negative electrode

The invention claimed is:

1. A method for pre-lithiating a negative electrode, the method comprising:
   adding an inorganic powder to molten lithium to form a mixture;
   extruding the mixture and cooling the mixture to prepare a lithium metal-inorganic composite ribbon having a thickness of 100 μm to 200 μm;
   rolling the lithium metal-inorganic composite ribbon to produce a lithium metal-inorganic composite film; and
   bonding the lithium metal-inorganic composite film on a surface of the negative electrode to form a lithium metal-inorganic composite layer on the surface of the negative electrode.

2. The method of claim 1, wherein a thickness of the lithium metal-inorganic composite layer is 1 μm to 50 μm.

3. The method of claim 1, wherein the inorganic powder comprises at least one selected from the group consisting of alumina ($Al_2O_3$), titanium dioxide ($TiO_2$), zirconium dioxide ($ZrO_2$), silicon dioxide ($SiO_2$), tin oxide ($SnO_2$), cerium oxide ($CeO_2$), magnesium oxide (MgO), calcium oxide (CaO), and yttria ($Y_2O_3$).

4. The method of claim 1, wherein a mixing ratio of the molten lithium and the inorganic powder is 70 to 85% by volume of the molten lithium and 15 to 30% by volume of the inorganic powder.

5. The method of claim 1, further comprising
   mixing a binder with the molten lithium or the mixture of the molten lithium and inorganic powder.

6. The method of claim 1, wherein the lithium metal-inorganic composite layer does not remain in a metallic form of lithium after an initial activation charge.

7. The method of claim 1, wherein the inorganic powder has a particle diameter of 0.1 μm to 10 μm.

8. The method of claim 1, wherein the negative electrode comprises silicon oxide.

\* \* \* \* \*